United States Patent
Kumbhashi et al.

(10) Patent No.: US 12,530,491 B2
(45) Date of Patent: Jan. 20, 2026

(54) SELECTIVE DELETION OF SENSITIVE DATA

(71) Applicant: Hewlett Packard Enterprise Development LP, Spring, TX (US)

(72) Inventors: Vijaya Kumbhashi, Karnataka (IN); Prashanth Kamath Udyavar, Karnataka (IN); Venkataraman Sankara Rama Subramanian, Karnataka (IN); Manikandan Krishnan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 343 days.

(21) Appl. No.: 18/296,245

(22) Filed: Apr. 5, 2023

(65) Prior Publication Data
US 2024/0249020 A1 Jul. 25, 2024

(30) Foreign Application Priority Data
Jan. 24, 2023 (IN) .............................. 202341004673

(51) Int. Cl.
*G06F 21/62* (2013.01)
(52) U.S. Cl.
CPC ........ *G06F 21/6245* (2013.01); *G06F 21/629* (2013.01)
(58) Field of Classification Search
CPC ... G06F 21/6245; G06F 21/629; G06F 9/4881
See application file for complete search history.

(56) References Cited

U.S. PATENT DOCUMENTS

| 8,950,005 | B1 * | 2/2015 | Torney | H04L 63/101 |
| | | | | 713/193 |
| 10,515,212 | B1 * | 12/2019 | McClintock | G06F 21/57 |
| 10,747,900 | B1 * | 8/2020 | Bendersky | G06F 21/6245 |
| 11,847,244 | B1 * | 12/2023 | Madan | G06N 3/045 |
| 2005/0257053 | A1 * | 11/2005 | Genty | G06F 21/31 |
| | | | | 713/167 |

(Continued)

FOREIGN PATENT DOCUMENTS

| CN | 104838630 A | * | 8/2015 | ............. G06F 21/00 |
| CN | 105493054 A | * | 4/2016 | ........... G06F 21/604 |

(Continued)

OTHER PUBLICATIONS

GDPR, "Art. 17 GDPRRight to erasure ('right to be forgotten')", available online at <https://web.archive.org/web/20220324003506/ https://gdpr-info.eu/art-17-gdpr/>, Mar. 24, 2022, 2 pages.

(Continued)

*Primary Examiner* — Sher A Khan
(74) *Attorney, Agent, or Firm* — Trop, Pruner & Hu, P.C.

(57) ABSTRACT

Examples disclosed herein relate to protecting sensitive data. An application program is loaded on to memory of a computing device. The application program includes application code and sensitivity information. The sensitivity information is detected to determine application sensitivity. In response to the determination of the application sensitivity, a data portion corresponding to the application program is cleared from the memory before loading another application program.

19 Claims, 5 Drawing Sheets

(56) References Cited

U.S. PATENT DOCUMENTS

| | | | | |
|---|---|---|---|---|
| 2005/0262557 | A1* | 11/2005 | Fellenstein | H04L 63/20 713/188 |
| 2008/0126301 | A1* | 5/2008 | Bank | G06F 11/366 707/E17.069 |
| 2008/0126751 | A1* | 5/2008 | Mizrachi | G06F 9/542 712/30 |
| 2015/0161397 | A1* | 6/2015 | Cook | G06F 21/6245 726/26 |
| 2016/0098566 | A1* | 4/2016 | Patil | G06Q 30/0256 726/26 |
| 2017/0039390 | A1* | 2/2017 | King | G06F 16/958 |
| 2018/0060588 | A1* | 3/2018 | Shaposhnik | G06F 21/57 |
| 2018/0227326 | A1* | 8/2018 | Shavro | H04L 67/34 |
| 2018/0276402 | A1* | 9/2018 | Allen | G06F 21/6263 |
| 2019/0171846 | A1* | 6/2019 | Conikee | G06F 21/6245 |
| 2019/0303626 | A1* | 10/2019 | Kaladgi | G06F 21/84 |
| 2020/0026877 | A1* | 1/2020 | Dattatri | G06F 21/6254 |
| 2020/0045047 | A1* | 2/2020 | Wu | H04L 63/0428 |
| 2020/0074108 | A1* | 3/2020 | Fox | G06F 21/6245 |
| 2020/0151348 | A1* | 5/2020 | Chauhan | H04L 67/53 |
| 2020/0394327 | A1* | 12/2020 | Childress | G06F 16/1824 |
| 2021/0194888 | A1* | 6/2021 | Bhaskar S | G06F 16/3347 |
| 2021/0319095 | A1* | 10/2021 | Whitmore | G06F 21/554 |
| 2021/0367964 | A1* | 11/2021 | Jones | G06F 21/6218 |
| 2022/0405274 | A1* | 12/2022 | Shang | G06F 16/2455 |
| 2023/0409736 | A1* | 12/2023 | Jothilingam | G06F 21/6245 |

FOREIGN PATENT DOCUMENTS

| | | | | |
|---|---|---|---|---|
| CN | 109977222 A | * | 7/2019 | G06F 21/6245 |
| CN | 111868694 A | * | 10/2020 | G06F 21/6245 |
| CN | 110598441 B | * | 7/2021 | G06F 21/32 |
| DE | 102005038614 A1 | * | 2/2007 | G07F 7/084 |
| KR | 20200060421 A | * | 5/2020 | G06F 9/5038 |
| WO | WO-2016168203 A1 | * | 10/2016 | H04L 63/061 |

OTHER PUBLICATIONS

Intel, "Intel(Registered) Software Guard Extensions Protects Data", available online at <https://www.intel.com/content/www/us/en/architecture-and-technology/software-guard-extensions-enhanced-data-protection.html>, retrieved from internet on May 3, 2023, 3 pages.

Joukov et al., "Secure Deletion Myths, Issues, and Solutions", ACM, 2006, 6 pages.

Reardon et al., "SoK: Secure Data Deletion", IEEE Symposium on Security and Privacy, 2013, 15 pages.

Wikipedia, "Address space layout randomization", available online at <https://en.wikipedia.org/w/index.php?title=Address_space_layout_randomization&oldid=1065197953>, Jan. 12, 2022, 10 pages.

Wikipedia, "Health Insurance Portability and Accountability Act", available online at <https://en.wikipedia.org/w/index.php?title=Health_Insurance_Portability_and_Accountability_Act&oldid=1085918925>, May 3, 2022, 21 pages.

* cited by examiner

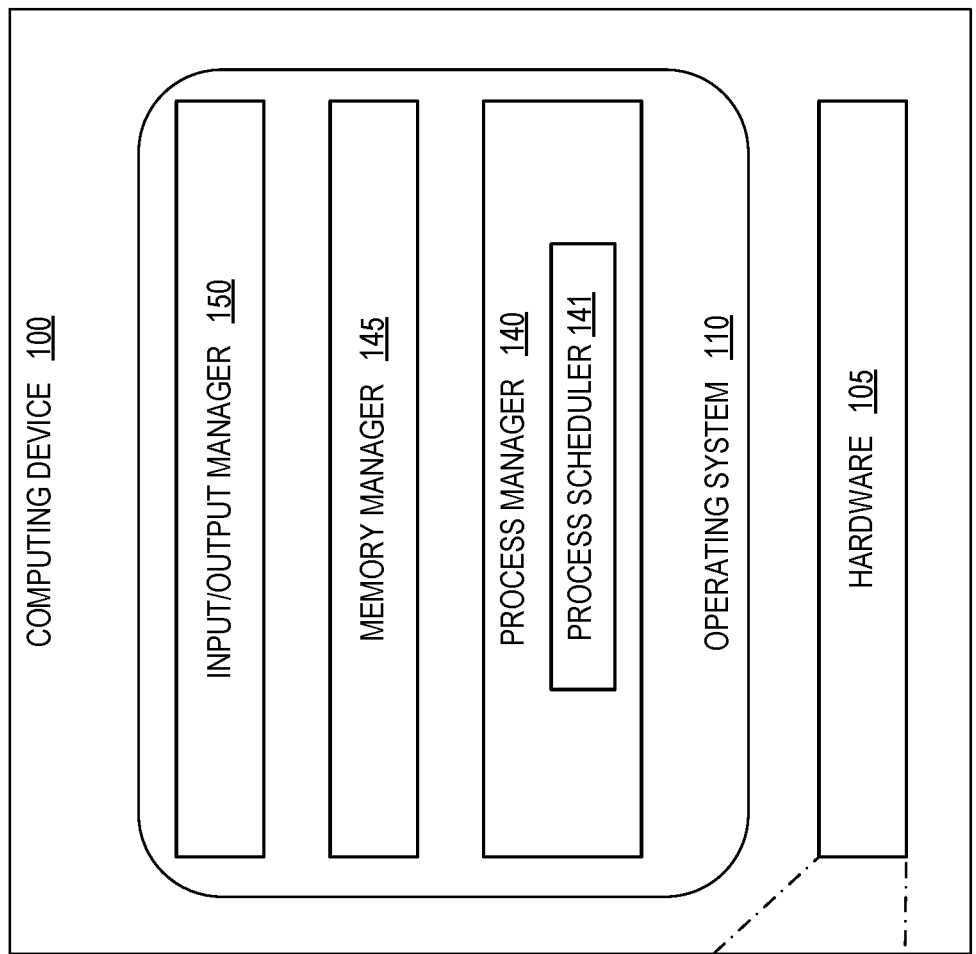
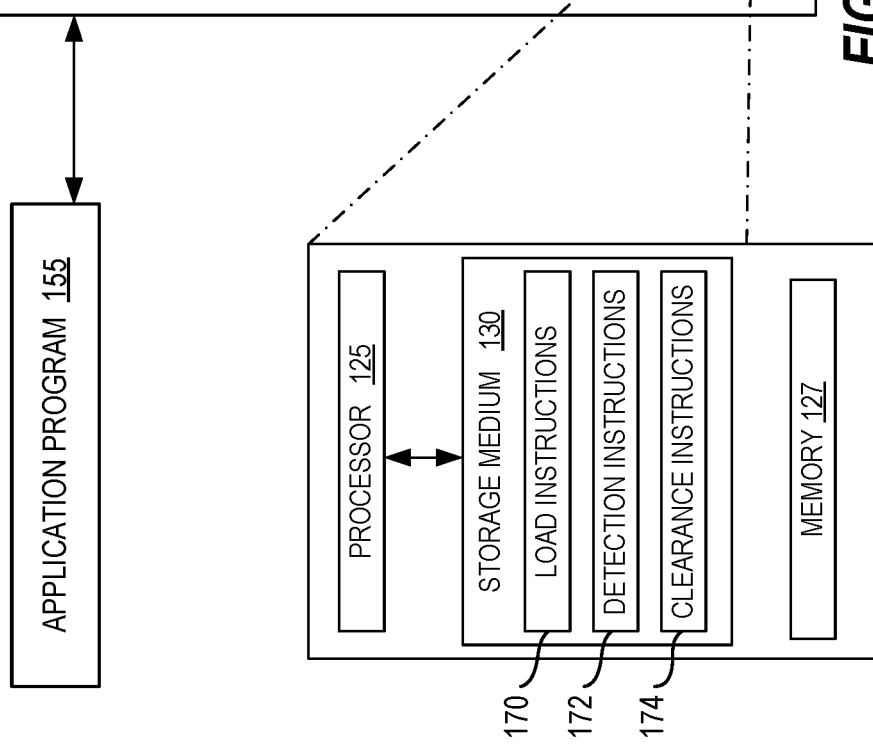
FIG. 1

200

```
┌─────────────────────────────────────────────────────────────────────┐
│ LOAD AN APPLICATION PROGRAM ON TO MEMORY OF A COMPUTING DEVICE,     │
│ WHEREIN THE APPLICATION PROGRAM INCLUDES APPLICATION CODE AND       │
│ SENSITIVITY INFORMATION  202                                        │
└─────────────────────────────────────────────────────────────────────┘
                                   │
                                   ▼
┌─────────────────────────────────────────────────────────────────────┐
│ DETECT THE SENSITIVITY INFORMATION TO DETERMINE APPLICATION         │
│ SENSITIVITY  204                                                    │
└─────────────────────────────────────────────────────────────────────┘
                                   │
                                   ▼
┌─────────────────────────────────────────────────────────────────────┐
│ CLEAR A DATA PORTION CORRESPONDING TO THE APPLICATION PROGRAM FROM  │
│ THE MEMORY BEFORE LOADING ANOTHER APPLICATION PROGRAM  206          │
└─────────────────────────────────────────────────────────────────────┘
```

*FIG. 2*

SELECTIVE DELETION OF SENSITIVE DATA

BACKGROUND

With the evolution of computing technology, modern-day computing devices are equipped to support multiprogramming/multi-processing. An Operating System (OS) of a computing device is tasked to manage the resources of a computing device (e.g., processing power, memory, etc.) efficiently to run application/s. Certain applications may operate on data. The protection of data containing sensitive data of individuals/organizations is of paramount importance. Sensitive data may include Personally Identifiable Information (PII), financial information, Social Security Number or Aadhaar information (in India), etc. Mishandling of such sensitive data may result in catastrophic circumstances and may even invite legal liabilities.

BRIEF DESCRIPTION OF THE DRAWINGS

Some implementations of the present disclosure are described with respect to the following figures.

FIG. 1 depicts a schematic view of an operating system environment on a computing device, according to various examples of the present disclosure;

FIG. 2 illustrates a flow chart for a method of detection and clearance of sensitive data from memory, according to various examples of the present disclosure;

Figure 3:
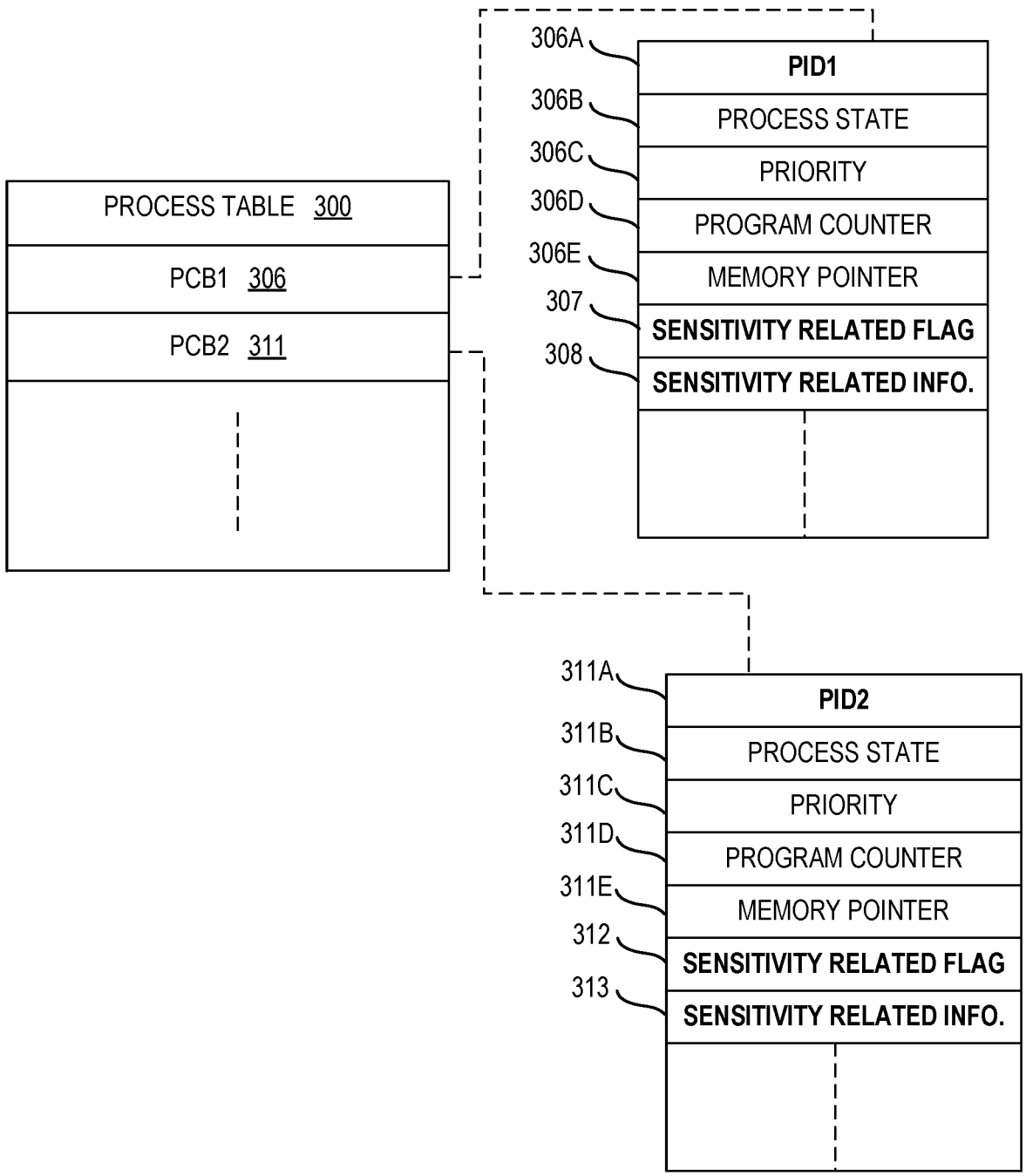
FIG. 3 is a schematic view of sensitivity information flagging in an application program code, according to some examples of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Generally, an application program includes code, which can be computer-readable instructions, for performing specific tasks. The program code can be in a source code format, which is in accordance with a given programming language. The source code can be transformed into executable code. The executable code can be executed by the resources of a computing device with the support of an Operating System (OS). An application program is an application instance with executable code being run on a computing device. The OS includes a process scheduler configured to schedule various processes. A process scheduler may remove a current process from execution by a processor and select another process based on various conditions, such as resource sharing, prioritization, etc.

Further, certain processes may collect data for execution. The data may be stored in memory. In some applications, the collected data can be sensitive. Generally, when dealing with sensitive data, it may be protected by way of encryption or other protection techniques during the transit of the data. However, the data may be decrypted and loaded onto memory to be used by a given application.

In some instances, the decrypted data may be at risk of unauthorized access. For example, an application after collecting sensitive data may fail to wipe out the memory. Such failure can be attributed to programming or failure conditions. Generally, a process is terminated or swapped out of memory for various reasons including when a scheduled time is up.

A process that is coming in subsequently can be a rogue process, a malicious process, or a process with limited privileges. The sensitive data might be accessible to a subsequent application program that is loaded onto the memory. In some examples, the process that subsequently runs can be a rogue/malicious application. The rogue/malicious application may mine for data footprints of a previously run application program. Such applications can access sensitive data or data footprint from a previously run application program. Certain rogue applications may be equipped to analyze and identify patterns from the scraped data obtained through this side channel, which may be referred to as a Side Channel Attack (SCA). Further, certain systems, such as multi-tenant public cloud environments that handle multiple users, are also vulnerable to such attacks.

To mitigate SCAs, some OSs are configured to zero out memory pages before assigning them to another application program. However, frequent zeroing out of memory may create an overhead on system performance. Moreover, frequent zeroing/erasure may also affect memory performance. For example, certain memory designs may use erase blocks. These erase blocks may be prepared to store fresh data by removing all existing data. Frequent erasure in the long term may cause some of these blocks to be unusable. This adds to the service/maintenance cost of the computing devices.

Alternatively, some applications may be scrutinized and certified based on the application's capability to wipe sensitive data from memory. However, such scrutiny and certification of applications add to lead time and may add to the cost of developing applications. Such certification-based techniques may create an overhead on the OS, as the OS may have to retrieve and validate the authenticity of such certificates. Some compilers may use directives/language extensions to identify and clear sensitive data from fields of application. However, applications and applications programs may have to be written to be compatible to comply with such compiler-based scrutiny. Certain legacy applications may be incompatible with such compiler-based techniques. Even certain compiler/language tools may have to be reprogrammed. Further, some hardware-based protected execution environments that are known are limited to applications that run on that hardware.

Hence, the present disclosure provides techniques to selectively clear sensitive data by an operating system component. In some examples, the operating system component is configured to clear the sensitive data from memory before a given process handling that sensitive data is scheduled out/terminated. According to some examples, a memory manager of a computing device is configured to selectively clear sensitive data collected/used by an application to reduce/prevent Side Channel Attacks (SCAs). According to some examples, selective clearing may be based on a sensitivity field loaded on system memory. In some examples, a program scheduler of an operating system may load an application program onto a memory. The application program may include application code and sensitivity information. In one example, the sensitivity information can be a sensitivity flag stored in a metadata of the application program. In some other examples, the sensitivity information may be embedded in the application code of an application program.

According to some examples, sensitivity information may be stored in a dedicated block of memory. The dedicated block can be a process table including an array of Process Control Block (PCB), Process Security Block (PSB), an operating system component, or the like. According to some examples, sensitivity information of the application program can be a sensitivity attribute or a sensitivity flag enabled/disabled in a metadata of the application program. In some examples, a user, an administrator, or any authorized system may enable a sensitivity flag in the application program. The sensitivity flag can be read and loaded onto memory by a program scheduler of an operating system.

According to some examples, the application program may include executables and metadata. Metadata can be data that aids in the execution of the program. In one example, the metadata can be stored within binary data. In another example, the metadata can be stored outside binary data. According to some examples, the application program may include unique identifiers, such as index nodes, for given metadata. In addition to sensitivity information, the metadata may include the manner of execution, permission details, etc.

In some examples, a scheduler of the OS performs the task of bringing a process into the memory for execution and swapping it out when the time is over, or the priority is bumped down.

According to some examples, steps for determining whether an application program includes sensitive information can be performed at a development stage of the application program. In some other examples, techniques may include intelligent identification of sensitive applications (e.g., applications handling sensitive data) and may be a model based on Artificial Intelligence (AI), Machine Learning (ML), rules or criteria based, etc. In one example, upon such identification, a sensitivity field such as a flag in the sensitivity information of the application program can be enabled/marked. Thus, dependency on applications to clear sensitive data is reduced, as programming techniques and logic may vary from one application to another. In some examples, the operating system can be configured to selectively disable clearing operations, based on the condition that an application program is configured to clear sensitive data. Such selective disabling optimizes resource usage by the operating system and can be used to reduce/eliminate redundant operations.

According to some examples, clearing sensitive data from the memory may include wiping out the data portion of the memory. This restricts access of sensitive data related to an outgoing application program to an incoming application program. In some examples, wiping out operation may include overwriting the memory with zeroes, predefined characters/data/pattern, or random data. This overwriting operation reduces the risk of retrieving any residual information.

In yet some examples, the operating system is configured to identify and/or determine an application sensitivity based on user information, owner or entity information, etc. For example, in certain production environments, sensitive applications are authorized to be run by a certain set of users or entities. Accordingly, sensitivity information can be provided in the metadata of the user/entity associated with the application. The sensitivity information can be loaded onto memory.

FIG. 1 depicts a schematic block diagram of an operating system environment on a computing device, according to various examples of the present disclosure. The computing device 100 may include a hardware 105, and an operating system (OS) 110 deployed on the hardware 105. The computing device 100 may further include one of the following non-illustrated components: an input/output device, a storage drive (e.g., a hard disk drive (HDD), a Solid-State Drive (SSD), etc.), a display, a BIOS ROM, each being connected through a bus. The storage disk may include a boot file to load the OS 110.

In some examples, the OS 110 can be implemented in the form of programs stored in a storage drive loaded into the main memory and executed by the processor.

The operating system 110 may include a kernel. As used herein, a kernel can be a core component of an OS. The kernel may control the operation of various systems of the computing device. The kernel may facilitate interactions between hardware and software components. In some examples, a kernel can be an operating system code loaded and operating on memory. As used herein, an operating system is a set of instructions or code that controls the operation of a computing device and the execution of programs on the computing device.

In some examples, the kernel may include a process manager 140, a memory manager 145, an input/output manager 150, and so forth. In some examples, the process manager 140 may include a list of processes and a process scheduler 141. The list of processes may indicate the currently created process list in the computing device 100. The process manager can be configured to create, run, suspend, swap, etc. a process and/or a thread. In some examples, the process scheduler can transition a created process from one state to another. In one example, an OS may cause a program to transition from ready to run state. Further, the OS may perform certain preemptive multitasking operations for running the program. In a further example, a created process can be in a ready state and transitioned to a run state. When in a suspended state, a program is neither in a run state nor in a ready state.

An application program 155 may include one or more processes. A process can be an executing program. A process may include one or more threads that run in the context of the process. The computing device 100 may allocate processing time to a thread, which can be a basic unit of processing. Further, a thread may consume computing device resources when executing the application program 155.

As illustrated in FIG. 1, the hardware 105 may include a processor 125 and a storage medium 130. The processor 125 can be functionally coupled to the storage medium 130 and memory 127 through a high-speed bus or the like. The storage medium 130 can be a non-transitory machine-readable type and is capable of storing instructions. As used herein, a storage system can be a storage infrastructure and associated control logic used for storing data. In some examples, the instructions may correspond to a process management system. Hence, the instructions 170, 172, 174 may be referred to as process management instructions.

According to some examples, the processor 125 may execute load instructions 170 that cause the processor to load an application program onto the memory 127. The application program may include an application code. As used herein, application code is a set of machine-readable instructions to perform application-specific operations. In some examples, application code is obtained from compiling of application source code.

Further, the application program may include sensitivity information that is also loaded onto the memory 127. As used herein, sensitivity information may refer to data that indicates whether an application program operates/uses sensitive data or not.

In some examples, the processor 125 executes detection instructions 172 that cause the processor 125 to detect the sensitivity information to determine an application sensitivity. According to some examples, the sensitivity information can be a sensitivity field/flag the indicate data-sensitiveness of the application program. In some examples, the sensitivity information can be an attribute added to the metadata of the application program file. According to some examples, detection of the sensitivity information may include reading the sensitivity field from memory 127.

Further, an application program that works on sensitive information may be referred to as a sensitive application. Such an application may have high application sensitivity and the sensitivity field/flag may be enabled. In other examples, an application working on public information may be referred to as a non-sensitive application. Such an application may have low application sensitivity and corresponding sensitivity metadata.

According to some examples, the processor 125 may execute clearance instructions 174 that cause the processor 125 to clear a data portion corresponding to the application program from the memory before loading another application program onto the memory. Clearing actions may be performed in response to the determination of the application sensitivity. For example, based on a determination that the application sensitivity is high, the memory is cleared. In some examples, certain application programs may work on sensitive data. In some examples, the sensitive data can be Personally Identifiable Information (PII), privileged information, financial information of a user or an organization, or other private or confidential information.

In some further examples, sensitive data may be defined dynamically. That is, with time, what can be construed as sensitive data can be determined based on rules, laws, national/international policies, or the like.

In some examples, certain application programs may use credentials, such as authorization or password to obtain access to sensitive information. Appropriate credentials may enable the decryption of sensitive data to be loaded onto memory 127 for the application program to work.

According to some examples, the computing device 100 can be a service-providing system (e.g., a server) to an application or another computing device, such as a workstation, a mobile device, a desktop device, etc. In some examples, a client device may send tasks/application requests to the computing device for execution. In some further examples, the computing device 100 can be a large-scale distributed computer system and applications can be composed of multiple processes. The resources, such as processor time, memory, etc. needed by each process may be controlled by the OS.

FIG. 2 illustrates a flow diagram depicting method 200 of detecting and clearing sensitive data from memory, according to various examples of the present disclosure. In some examples, the method 200 may be encoded as instructions in a machine-readable storage medium. The instructions can be executable by a processor (e.g., the processor 125 of FIG. 1). According to some examples, the instructions may correspond to a process management instructions.

Now referring to method 200, according to some examples, at block 202, a process manager of the operating system may load an application program onto a memory of a computing device. The application program may include executables and metadata. Further, the application program may include sensitivity information that is also loaded onto the memory. As used herein, metadata is structured and/or encoded information that describes characteristics of information-bearing entities. Metadata may aid in the identification, discovery, assessment, and/or management of the described entities (e.g., application program).

In some examples, at block 204, a memory manager of the operating system may detect the sensitivity information to determine an application's sensitivity. According to some examples, the sensitivity information can be in a sensitivity field that indicates the data sensitiveness of the application program. In some examples, the sensitivity information can be an attribute added to the metadata of the application program file. According to some examples, detection of the sensitivity information may include reading the sensitivity field from memory.

Further, an application program that works on sensitive information may be referred to as a sensitive application. Such an application may have high application sensitivity and the sensitivity field/flag may be enabled. Whereas, an application working on public information may be referred to as a non-sensitive application. Such an application may have low application sensitivity and corresponding sensitivity application.

According to some examples, at block 206, the memory manager may clear a data portion corresponding to the application program from the memory before loading another application program (or incoming process) onto the memory. As used herein, the data portion is a portion in a memory that is used to store sensitive data among other data corresponding to an application portion. Clearing actions may be performed in response to the determination of the application sensitivity. For example, based on a determination that the application sensitivity is enabled, the memory can be cleared. In some examples, certain application programs may work on sensitive data. As noted, in some examples, the sensitive data can be Personally Identifiable Information (PII), privileged information, financial information of a user or an organization, or other private information. An authorized application program that has gained access rights to sensitive data to operate on it may only be able to access the sensitive data. As used herein, an authorized application can refer to an application designated by an application user, administrator, or through an Application Programming Interface as being authorized to access sensitive data.

In some examples, the method 200 may be repeated before a state change of a process that results in the process to be swapped/interrupted/terminated/suspended. Further, the method may include additional blocks/steps that are discussed herein.

FIG. 3 illustrates a schematic view of a process table and process control blocks, according to various examples of the present disclosure. As discussed earlier, the OS may perform certain identification operations when creating a process for its identification. In some examples, the OS may assign a Process Identification (PID) to each process for identification. In some examples, a Process Control Block (PCB) may be used for the identification of a specific process. The PCB may include a plurality of blocks that store information about a process. A process identifier (e.g., PID1 306A, PID2 311A) can be used to refer to a particular PCB of a process. Process related information can be saved and used for switching from one state to another. When the process makes a transition from one state to another, the OS may update the process related information in the PCB.

As illustrated in FIG. 3, the process table 300 may include an array of PCBs. The OS may save process related information of each created process may be saved in the process table. The process related information may include process state 306B, 311B, priority 306C, 311C, program counter 306D, 311D, memory pointer 306E, 311E, etc. The process state 306B, 311B may be used to store a current state of a given process. The priority field 306B, 311B may indicate a process priority for the processor to execute accordingly. The program counter 306D, 311D may store the address of a subsequent instruction to be executed for the process. The memory pointer 306E, 311E may refer to a parent process. An open files list may include a list of files opened for a process. As used herein, a process table is an array of Process Control Blocks (PCBs) or the like. Various operations are performed by an operating system and such information is tracked using a process table. In some examples, a process table may store information, such as registers (including sensitivity flag info.), quantum, priority, etc.

Further, each PCB (e.g., PCB1, PCB2) is configured to include memory sensitivity fields/flags (e.g., sensitivity related flags 307, 312 and sensitivity related information 308, 313). A sensitivity flag may be enabled or disabled based on the condition that a process associated with the application program handles sensitive information or not. As used herein, a sensitivity flag is an attribute stored in the metadata of an application program. In a multi-process handling computing device (e.g., the computing device 100), there may be switching between multiple processes. For example, a kernel of the OS may switch between multiple processes. Based on techniques discussed herein, a memory manager (e.g., the memory manager 145 of FIG. 1) may clear the data portion of the memory when a process handling sensitive data is swapped, terminated, or the like. As used herein, a swap operation by an operation may release an existing process out of the main memory into a storage drive (e.g., hard disk) or a secondary storage memory to allocate memory to an incoming process.

According to an illustrative example, two processes PID1 306A and PID2 311A may each refer to separate application programs. In one example, process PID1 306A may correspond to an application program handling sensitive data (e.g., a sensitive application). Process PID2 311A can correspond to an application program that is independent of the aforementioned sensitive application. The processes PID1 306A and PID2 311A may use resources of computing on which they are being executed. The resources can be memory, processor cycles, registers, etc. The OS may allocate a certain amount of resources for each process.

According to some examples, the OS may allocate certain resources to the process PID1 306A (hereinafter referred to as the first process). The OS may allocate a certain processing time to the first process PID1 306A. The first process PID1 306A may work on certain sensitive data, which may be stored in the memory. The OS may switch to another process PID2 311A (hereinafter referred to as the second process) upon completion of the first process related process time. The OS may update the first process related information in the respective PCB. Further, as per techniques discussed herein, the memory manager may read the sensitivity information corresponding to the first process. Based on the condition that the sensitivity flag 307 of the first process is enabled, the memory manager may clear the data portion before handing resources to the second process. Upon completion of the processing time of the second process PID2, the first process PID1 may be restored by referring to the PCB PCB1 306A of the first process. Further, the data portion corresponding to the second process PID2 311A may be cleared based on the sensitivity information corresponding to the second process PID2 312. The computing device can perform multi-tasking by task scheduling without compromising or providing access to sensitive data to unauthorized applications. Techniques for enabling/disabling sensitivity information are discussed in conjunction with examples in FIG. 4.

Figure 4:
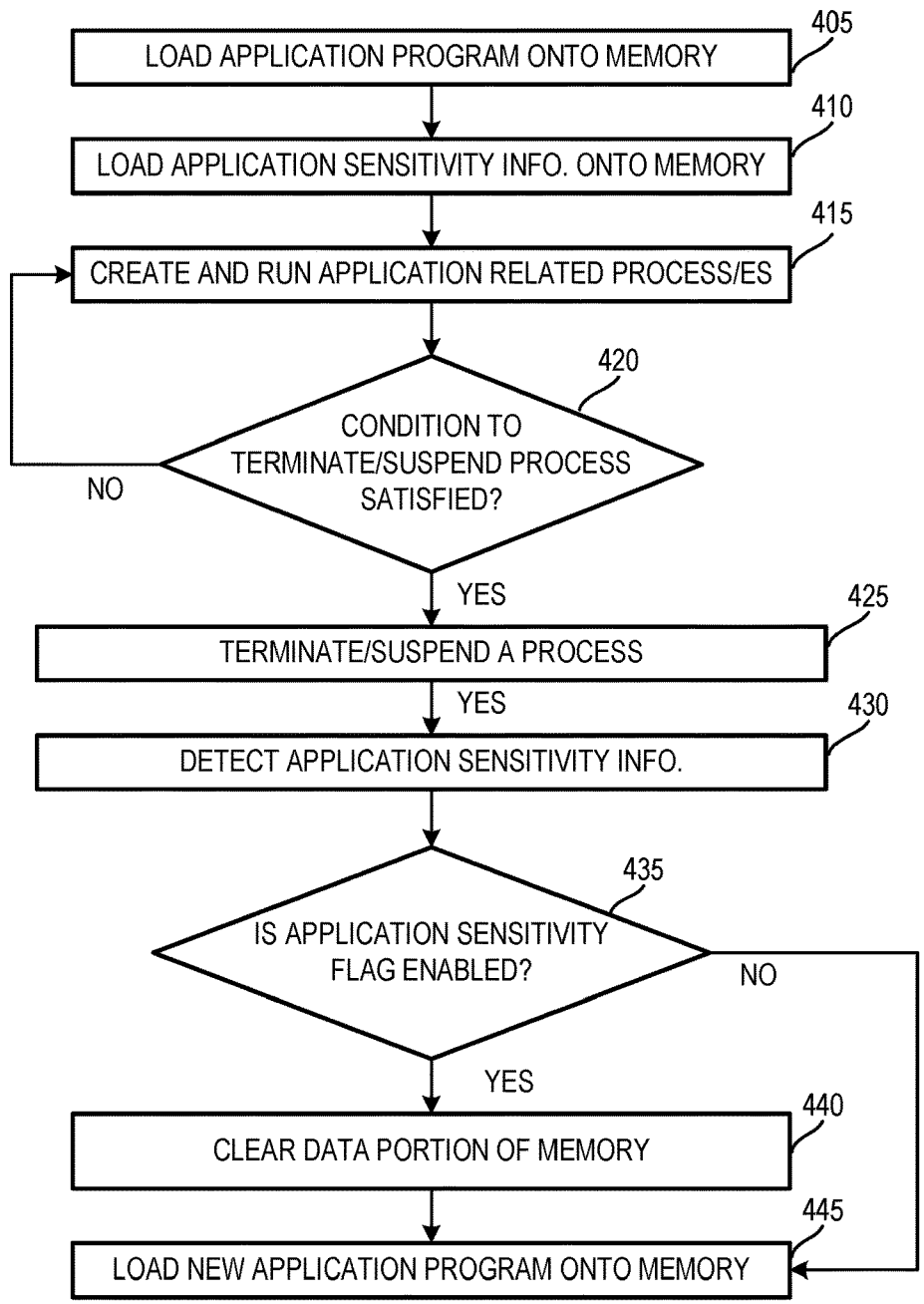
FIG. 4 is a flow diagram of a process according to some examples.

FIG. 4 illustrates a schematic view of a flow diagram of a process, according to various examples of the present disclosure. The method 400 can be encoded as instructions on a non-transitory storage medium. The instructions can be at least partially executable by a processing resource, such as the processor 125 of FIG. 1.

Now referring to the flow diagram 400, according to some examples, at block 405, a process management system may load an application program onto a memory of a computing device. In some examples, as discussed herein, the process management system can be a set of instructions (e.g., process management instructions) that are executable by a processor.

At block 410, the process management system may load an application's sensitivity information onto the memory. In some examples, the process management system may enable/disable certain sensitivity-related flags (e.g., flags 307 or 312 of FIG. 3) based on the sensitivity-related information. In some examples, the process management system (e.g., a process loader component of the OS) may read the sensitivity field and store that information in a Process Control Block (PCB) or Process Security Block (PSB) corresponding to the process.

In some examples, the flags 307 or 312 may be enabled/disabled based on input from an API, a network administrator, or an application developer. In some examples, the flags 307 or 312 may be enabled based on certain criteria. The criteria may be dependent on data being loaded onto the memory. In some examples, the data can be categorized as extremely sensitive data (e.g., private, confidential data) or low sensitive data (e.g., internal data, public data, etc.). In some examples, more than two variants of the data sensitivity may be available.

In some examples, the determination of whether an application program handles sensitive information or not may be performed at the development stage of the application. The determination process may include the identification of whether the application program uses any sensitive information when its processes are created and/or run. Based on such determination, an Application Programming Interface (API) may be used to include such information in the application program data. In some examples, the application program may include executables and metadata. The metadata portion of the application program can be used to store the sensitivity information. The sensitivity information can be loaded onto the memory by the process management system. In some examples, based on the application sensitivity information from metadata, the sensitivity fields in a Process Control Block (PCB) can be enabled or disabled.

In some other examples, techniques may include intelligent identification and/or determination of whether an application uses sensitive data. Model/s based on at least one of an Artificial Intelligence (AI) or Machine Learning (ML) can be used for such determination. In one example, upon such identification, a sensitivity field in the sensitivity information of the application program can be enabled.

At block 415, according to some examples, the process scheduler can transition a created process from one state to another. In one example, an operating system may cause a program to transition from ready to run state; OS may perform certain preemptive multitasking operations for running the program. As used herein, a process scheduler is a component of an operating system that handles the loading of processes, removal of the running process, and selection of another process based on various criteria.

In a further example, a created process can be in a ready state and transitioned to a run state. Whereas in a suspended state, a program is neither in a run state nor in a ready state.

At block 420, the operating system may check whether any conditions for process suspension/termination of a process are satisfied. The suspension or termination conditions may include the expiration of a timer, change in priority of processes, interruption event, etc. Based on the condition that no condition for termination/suspension is satisfied, the operating system continues to run the process corresponding to the application program.

At block 425, based on a condition that one or more conditions corresponding to termination/suspension/schedule out of a process are satisfied, the operating system (e.g., a process manager) may terminate/suspend a process. The suspension/termination of a process may include updating the state of the process. An update in the state of the process may be due to transitioning of the process from one state to another.

At block 430, a memory manager of the operating system may detect application sensitivity information from the memory. In some examples, detection of the application sensitivity information may include reading the application sensitivity field from the memory. The memory manager may read whether an application sensitivity flag is enabled or disabled At block 435, the memory manager may determine based on the detected application sensitivity information whether the given application is a sensitive application or not. In some examples, the memory manager may additionally refer to sensitivity related information (e.g., sensitivity related information 308, 313 of FIG. 3) to further assess application sensitivity. That is certain applications may operate on extremely sensitive data; whereas, some other applications may operate on medium or low sensitivity information.

At block 440, based on the condition that the application sensitivity flag is enabled, the memory manager may clear sensitive data from the memory. The memory manager may clear a data portion of the memory. In some examples, clearing the memory may include wiping out the data portion of the memory. Wiping of the data portion may help in reducing/eliminating access to sensitive data related to an outgoing application program to an incoming application program. In some examples, wiping out operation may include overwriting the memory with zeroes, predefined characters/data/pattern, or random data. This overwriting operation reduces the risk of retrieving any residual information and can be selectively used to optimize processor cycle utilization. At block 445, the incoming application program can be loaded onto the memory for execution and/or for the creation of processes. As used herein, overwrite is an operation performed on memory to clear data by replacing it with other information.

Although blocks shown in FIG. 4 are in a specific order, the order may not be exclusive. One or more blocks may be performed in any order, at any time, may be performed repeatedly, and/or may be performed by any suitable device or devices. Blocks 405-445 as illustrated in FIG. 4 can be instructions stored in a non-transitory storage medium, such as the storage medium 130 of FIG. 1. The instructions can be executed by a processor that causes the processor to perform one or more actions as discussed in blocks 405-445. The processor and the non-transitory storage medium can be part of a node or a computing device 100 discussed earlier.

Figure 5:
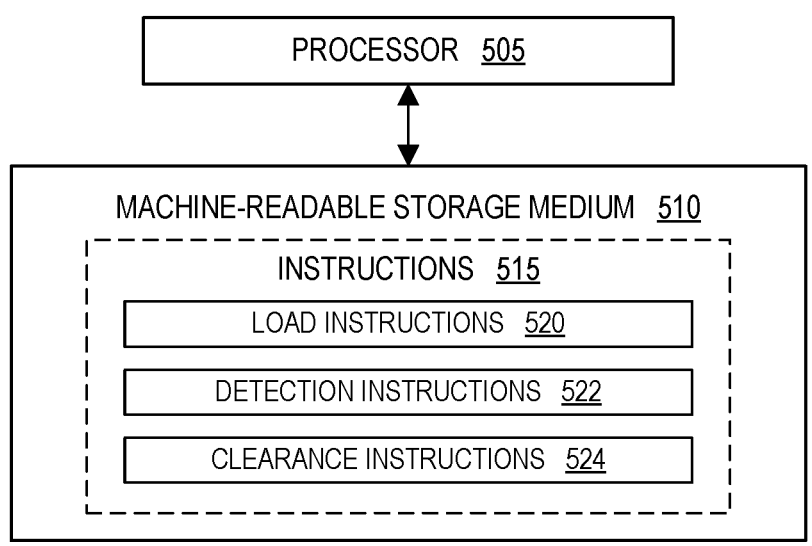
FIG. 5 is a block diagram of a storage medium storing machine-readable instructions according to some examples.

FIG. 5 is a block diagram of a non-transitory machine-readable or computer-readable storage medium storing machine-readable instructions that upon execution cause a storage system to perform various tasks. The instructions 515 on the machine-readable storage medium 510 (e.g., a non-transitory) can be executable by a processor 505.

The load instructions 520, may be executable by the processor 505, to load an application program onto the memory. The application program may include an application code. Further, the application program may include sensitivity information that is also loaded onto the memory. As used herein, sensitivity information may refer to data that indicates whether an application program operates/uses sensitive data or not. As used herein, load/loading is an operation of reading contents of executables of the application program into memory. Loading may also include preparatory tasks to run the executables (e.g., code). Upon loading, the operating system may pass control to the loaded application program.

The detection instruction 522, may be executable by the processor 505, to detect the sensitivity information to determine an application sensitivity. According to some examples, the sensitivity information can be a sensitivity field/flag the indicate data-sensitiveness of the application program. According to some examples, detection of the sensitivity information may include reading the sensitivity field from memory.

The clearance instructions 524, may be executable by the processor 505, to clear a data portion corresponding to the application program from the memory before loading another application program onto the memory. Clearing actions may be performed in response to the determination of the application sensitivity. For example, based on a determination that the application sensitivity is high, the memory is cleared. As used herein, memory may refer to a collection of memory cells whose contents can be accessed at high speeds but are retained only temporarily. In some examples, application programs and associated data may be loaded onto the memory to be readable and executable by a processor. In some examples, certain application programs may work on sensitive data. In some examples, the sensitive data can be Personally Identifiable Information (PII), privileged information, financial information of a user or an organization, or other private information.

According to some examples, the storage medium 510 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, the use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but does not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
 a memory;
 a processor; and
 a non-transitory storage medium storing instructions of an operating system (OS) that when executed cause the processor to:
  load a first application program onto the memory, wherein the first application program includes application code and sensitivity information; and
  based on detecting a swap of a process of the first application program from the memory and before loading a second application program onto the memory:
   detect the sensitivity information to determine an application sensitivity of the first application program, and
   based on the sensitivity information, clear a data portion corresponding to the first application program from the memory.

2. The system of claim 1, wherein the instructions when executed cause the processor to:
 read the sensitivity information from metadata of the first application program; and
 store the sensitivity information in a dedicated space in the memory.

3. The system of claim 2, wherein the detecting of the sensitivity information comprises:
 reading the sensitivity information from the dedicated space in the memory.

4. The system of claim 1, wherein the clearing of the data portion comprises:
 overwriting the data portion in the memory with at least one of zeroes, predefined data, or random data.

5. The system of claim 1, wherein the instructions when executed cause the processor to:
 clear the data portion from the memory before handing resources of the memory to the second application program.

6. The system of claim 1, wherein the sensitivity information comprises a sensitivity flag set to a first state to indicate a higher sensitivity level of the first application program.

7. The system of claim 6, wherein the instructions when executed cause the processor to:
 load the second application program onto the memory after the clearing of the data portion, the second application program including application code and a sensitivity flag set to a second state to indicate a lower sensitivity level of the second application program;
 based on detecting a swap of a process of the second application program from the memory:
  detect that the sensitivity flag of the second application program is set to the second state, and
  based on the sensitivity flag of the second application program being set to the second state, load another application program onto the memory without clearing a data portion corresponding to the second application program from the memory.

8. A method comprising:
 loading, by an operating system (OS) executed in a computer system, a first application program onto a memory of the computer system, wherein the first application program includes application code and sensitivity information;
 based on detecting a swap of a process of the first application program from the memory and before loading a second application program onto the memory:
  detecting, by the OS, the sensitivity information to determine an application sensitivity of the first application program, and
  based on the sensitivity information, clearing, by the OS, a data portion corresponding to the first application program from the memory.

9. The method of claim 8, comprising:
 storing, by the OS, the sensitivity information in a process table in the memory, the process table comprising at least one of a Process Control Block (PCB) or a Process Security Block (PSB) in the memory.

10. The method of claim 8, comprising:
 clearing the data portion from the memory before handing resources of the memory to the second application program.

11. The method of claim 8, further comprising:
 determining, using a model based on at least one of an Artificial Intelligence (AI) or Machine Learning (ML), that the first application program operates on sensitive data; and
 enabling a sensitivity flag in the sensitivity information of the first application program based on the determining using the model.

12. The method of claim 11, wherein the model is provided with at least one of a log information, event information, or other application data of one or more application programs.

13. The method of claim 8, wherein the sensitivity information comprises a sensitivity flag that is enabled to indicate a higher sensitivity level of the first application program.

14. The method of claim 13, further comprising:
 loading, by the OS, the second application program onto the memory after the clearing of the data portion, the second application program including application code and a sensitivity flag that is disabled to indicate a lower sensitivity level of the second application program;
 based on detecting a swap of a process of the second application program from the memory:
  detecting, by the OS, that the sensitivity flag of the second application program is disabled, and
  based on the sensitivity flag of the second application program being disabled, loading, by the OS, another application program onto the memory without clearing a data portion corresponding to the second application program from the memory.

15. The method of claim 8, wherein the computer system is capable of performing at least one of a multi-processing or multi-programming.

16. A non-transitory storage medium comprising instructions that when executed cause a system to:
  load a first application program onto a memory of the system, wherein the first application program includes application code and a sensitivity flag; and
  based on detecting a swap of a process of the first application program from the memory and before loading a second application program onto the memory:
    detect the sensitivity flag to determine an application sensitivity of the first application program, and
    based on the sensitivity flag, clear a data portion corresponding to the first application program from the memory.

17. The non-transitory storage medium of claim 16, wherein the instructions are part of an operating system kernel.

18. The non-transitory storage medium of claim 16, wherein the instructions when executed cause the system to: clear the data portion from the memory before handing resources of the memory to the second application program.

19. The non-transitory storage medium of claim 16, wherein the instructions when executed cause the system to:
  load the second application program onto the memory after the clearing of the data portion, the second application program including application code and a sensitivity flag that is set to a disabled state to indicate a lower sensitivity level of the second application program;
  based on detecting a swap of a process of the second application program from the memory:
    detect that the sensitivity flag of the second application program is set to the disabled state, and
    based on the sensitivity flag of the second application program being set to the disabled state, load another application program onto the memory without clearing a data portion corresponding to the second application program from the memory.

\* \* \* \* \*